United States Patent Office 3,272,247
Patented Sept. 13, 1966

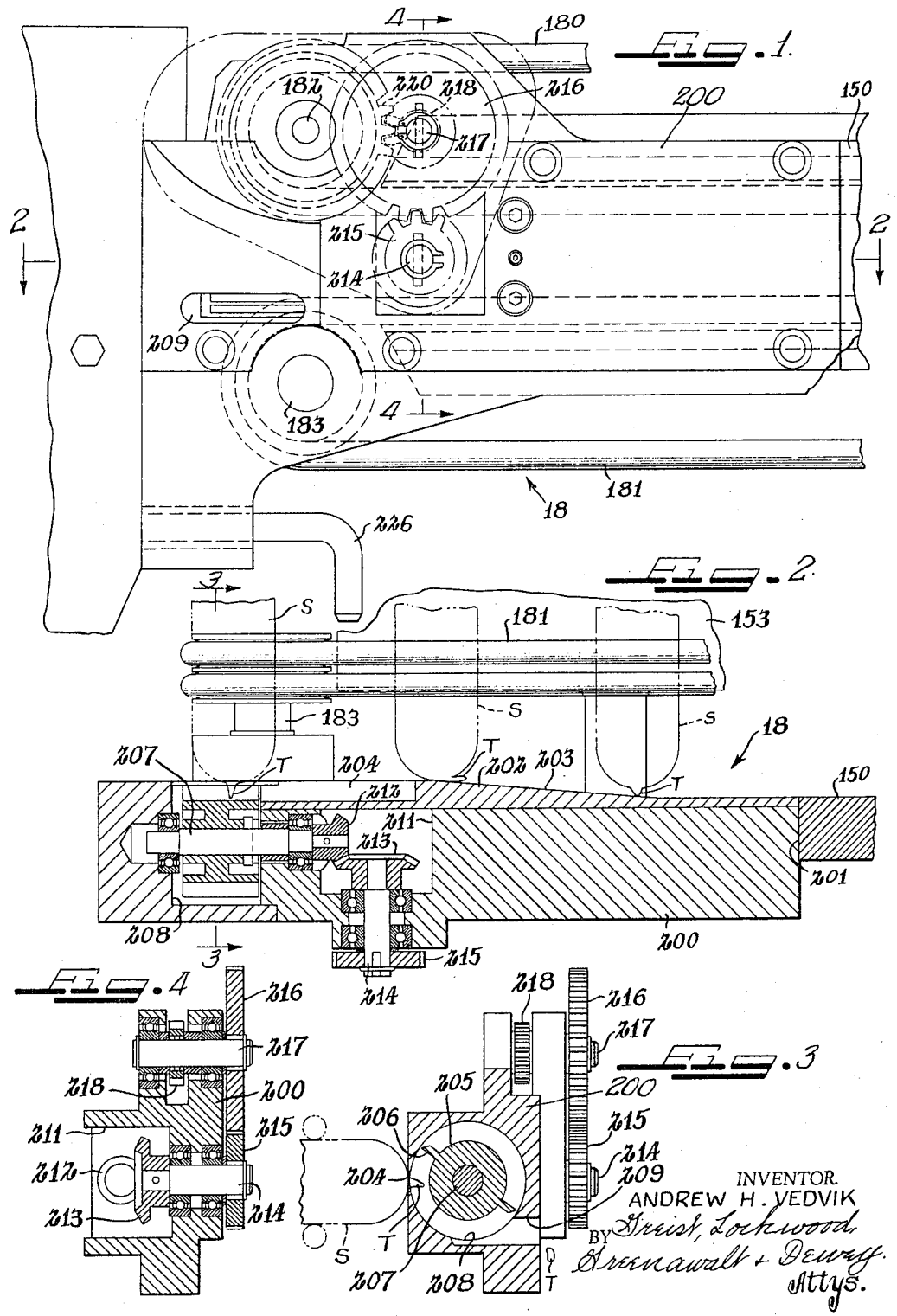

3,272,247
SAUSAGE END TRIMMING MACHINE
Andrew H. Vedvik, Madison, Wis., assignor to Oscar Mayer & Co., Inc., Chicago, Ill., a corporation of Illinois
Original application Jan. 29, 1963, Ser. No. 254,745, now Patent No. 3,217,766, dated Nov. 16, 1965. Divided and this application July 20, 1965, Ser. No. 473,448
5 Claims. (Cl. 146—81)

This application is a division of Ser. No. 254,745, filed Jan. 29, 1963, now Patent Number 3,217,766.

This invention relates to article handling equipment and is more particularly concerned with improvements in apparatus for receiving elongated, generally cylindrical articles, specifically, sausages in a sausage making and processing line, and for preparing the sausages for packaging.

It is a general object of the invention to provide a cut-off mechanism for removing small tips at the ends of sausages which may result when the sausages are produced by dividing long lengths of stuffed casing into individual sausage forming sections, processing the linked sausages while they remain in the casing and subsequently removing the casing.

It is a more specific object of the invention to provide in a sausage handling operation a tip cutting mechanism in a conveyor structure where the sausages are advanced in side-by-side arrangement with the tip bearing ends traveling in a path along opposite sides of the conveyor, which cutting mechanism is disposed so as to remove projecting tips at opposite ends of each successive sausage.

These and other objects and advantages of the invention will be apparent from a description of the apparatus which is shown by way of illustration in the accompanying drawings wherein:

FIGURE 1 is an elevation on an enlarged scale of a portion of a sausage handling apparatus which incorporates therein a tip cut-off mechanism embodying the principal features of the invention;

FIGURE 2 is a cross section taken on the line 2—2 of FIGURE 1;

FIGURE 3 is a cross section taken on the line 3—3 of FIGURE 2; and

FIGURE 4 is a cross section taken on the line 4—4 of FIGURE 1.

Referring to the drawings, the apparatus illustrated is especially designed for use in a sausage manufacturing or processing operation where link sausages are delivered to the apparatus from casing stripping mechanisms by a series of conveyors and subsequently advanced to mechanism for forming the sausages into groups and transferring successive groups to a wrapping machine.

One conveyor 16 includes a main frame which carries upper and lower O-ring type belt assemblies 180 and 181 which assemblies have opposed runs in vertically disposed, parallel horizontal planes when the frame is in the position shown in FIGURE 1 for advancing the sausages. The belt assemblies 180 and 181 which are of identical construction are supported at their leading ends on cross shafts 182 and 183 extending between the side frame plates 150 and 151 in parallel relation and in vertical alignment when the conveyor frame is in horizontal position. The upper and lower belt assemblies 180 and 181 are of identical construction and only one will be described. The belt assembly 180 comprises two sets of parallel belt members 184 supported at their leading ends on pulleys 186 which are supported on the cross shaft 182. The two sets of belts 184 and their supporting pulleys are separated by an endless chain 187 which is supported on suitable sprockets with the leading end sprocket mounted on cross shaft 182. The belt assemblies 180 and 181 grip the sausages as the sausages advance between the belt and support pulleys. The cross shafts at the trailing ends of the belt assemblies 180 and 181 are connected in driven relation to the main drive for the machine.

The conveyor assembly 16 incorporates the cut-off mechanism 18 for removing the small tips T at the ends of the sausages which remain on the ends of the sausages S after they are removed from the casing. This mechanism 18 is mounted on the conveyor frame side plates 150 and 151 at the leading end thereof. As these tip removers or trimmers are of identical construction except for being rights and lefts, only one of these mechanisms will be described.

The tip cutting or trimming mechanism 18 on the side plate 150 comprises a base plate or mounting plate 200 (FIGURES 1 to 4) which is mounted in a slot 201 in the end of the side plate 150. A guide plate 202 is secured on the inside face of the mounting plate 200 which has a tapered vertical surface 203 along which the ends of successive sausages are forced as they are advanced by the belt assemblies 180 and 181. An elongate slot 204 is located in the plate 202 to align approximately with the longitudinal axis of the sausage and as successive sausages are advanced opposite the slot the tip T springs into the slot 204 (FIGURE 2). A cutter wheel 205 having a pair of circumferentially spaced blades 206 is mounted on a shaft 207 which is journaled in a recess in the end of the mounting plate 200 so that the cutter wheel 205 revolves in a longitudinally extending, cylindrical compartment 208 alongside the leading end of the slot 204, the latter opening into the compartment 208 so as to place the tip T in the path of movement of a blade 206 where it is cut off by rotation of the wheel 205 and is ejected through the discharge slot 209. The cutter wheel shaft 207 extends into the gear box forming recess 211 in the mounting plate 200 with a beveled gear 212 on the end thereof engaging with the gear 213 on the end of the shaft 214 which is journaled in the bearing forming recess in the side wall of the mounting plate 200 and which carries at its outer end a gear 215 meshing with a drive gear 216 on a parallel shaft 217 above the shaft 214. The shaft 217 is journaled in a slotted portion of the mounting plate 200 adjacent the top edge thereof and carries a pinion gear 218 which meshes with drive gear 220 on the cross shaft 182 so that the tip cutting mechanism 18 is driven from the cross shaft 182. A corresponding tip cutting mechanism of the same construction at the opposite end of shaft 182 is arranged on the opposite side wall 151 of the conveyor assembly 16 and driven from the shaft 182 in the same manner.

I claim:

1. Apparatus for handling small sausages which have small tip forming portions projecting from the ends thereof, said apparatus comprising a traveling conveyor disposed generally horizontal and having upper and lower conveyor members with confronting runs between which the sausages are confined for advance in transversely extending, side-by-side arrangement, cutter mechanism at opposite sides of the conveyor, each said cutter mechanism comprising a vertically disposed plate with a longitudinally extending guide slot positioned in the path of an end of the sausages for accommodating the projecting tips, said slot terminating at its leading end in an aperture providing an opening into a cutter housing, a cutter wheel mounted in the cutter housing for rotation on an axis extending in the direction of travel of the conveyor and carrying one or more knives for cutting off the sausage tips which extend through said aperture, and means for rotating said cutter wheel.

2. Apparatus for handling small sausages which have small tip forming portions projecting from opposite ends thereof, said apparatus comprising a traveling conveyor disposed generally horizontal and having upper and lower conveyor members with confronting runs between which the sausages are clamped for advance in transversely extending, parallel, side-by-side arrangement, cutter mechanism at opposite sides of the conveyor, each said cutter mechanism comprising a vertically disposed plate with a relatively shallow, longitudinally extending slot disposed in the path of an end of the sausages for receiving the projecting tips, said slot terminating at an aperture providing an opening into a recess, a cylindrical cutter wheel housed in said recess for rotation on an axis which extends in the direction of travel of the conveyor and one or more knives spaced about the periphery of said cutter wheel for cutting off the sausage tips which extend through said aperture, and means for driving said cutter wheel.

3. Apparatus for handling small sausages which have small tip forming portions projecting from opposite ends thereof, said apparatus comprising a horizontally disposed traveling conveyor having confronting runs between which the sausages are clamped for advance in transversely extending, parallel, side-by-side arrangement, cutter mechanism at opposite sides of the conveyor, each said cutter mechanism comprising a vertically disposed wall member with a relatively narrow elongate guide slot extending along the path of an end of the sausages for receiving therein the projecting tips, said slot terminating at an aperture providing an opening into a recess, a cylindrical cutter wheel housed in said recess, one or more knives spaced about the periphery of said cutter wheel and traveling in a path extending into said aperture for cutting off the sausage tips which extend through said aperture, and means for driving said cutter wheel.

4. Apparatus for handling small sausages which have small tip forming portions projecting from opposite ends thereof, said apparatus comprising a traveling conveyor having conveyor members on which the sausages are held for advance in transversely extending, side-by-side arrangement, cutter mechanism at opposite sides of the conveyor, each said cutter mechanism comprising a plate-like member with a relatively shallow elongate slot disposed along the path of an end of the sausages for receiving and guiding the projecting tips, a cylindrical cutter wheel mounted adjacent said plate-like member and having one or more knives spaced about the periphery of said cutter wheel which travel in a path extending across said slot for cutting off the sausage tips which extend into said slot, and means for driving said cutter wheel.

5. Apparatus for handling small sausages which have small tip forming portions projecting from the ends thereof, said apparatus comprising a traveling conveyor having horizontally disposed confronting runs between which the sausages are confined for advance in transversely extending, side-by-side arrangement, cutter mechanism at opposite sides of the conveyor, each said cutter mechanism comprising a vertically disposed plate with a longitudinally extending guide slot positioned along the path of an end of the sausages for receiving and guiding the projecting tips in a predetermined path, a cutter wheel mounted at the leading end of said slot for rotation on an axis extending in the direction of advance of the sausages and carrying one or more knives which travel in a path extending across the guide slot for cutting off the sausage tips which are received in said slot, and means for rotating said cutter wheel.

References Cited by the Examiner
UNITED STATES PATENTS

| | | | |
|---|---|---|---|
| 1,890,676 | 12/1932 | Fox | 146—81 X |
| 2,210,908 | 8/1940 | Ewald | 146—51 |
| 2,494,914 | 1/1950 | Urschel et al. | 146—83 |
| 2,800,681 | 7/1957 | Demarest | 17—1 |
| 3,179,138 | 4/1965 | Norris | 146—81 |

ROBERT C. RIORDON, *Primary Examiner.*

WILLIE G. ABERCROMBIE, *Examiner.*